US008152620B2

(12) United States Patent
Sabo

(10) Patent No.: US 8,152,620 B2
(45) Date of Patent: Apr. 10, 2012

(54) METHOD FOR INITIALIZING A GAME, AND A GAMING MACHINE

(75) Inventor: Oto Sabo, Gerasdorf/Oberlisse (AT)

(73) Assignee: Novomatic AG, Gumpoldskirchen (AT)

( * ) Notice: Subject to any disclaimer, the term of this patent is extended or adjusted under 35 U.S.C. 154(b) by 1361 days.

(21) Appl. No.: 10/542,563

(22) PCT Filed: Dec. 30, 2003

(86) PCT No.: PCT/AT03/00393
§ 371 (c)(1),
(2), (4) Date: Dec. 1, 2005

(87) PCT Pub. No.: WO2004/066225
PCT Pub. Date: Aug. 5, 2004

(65) Prior Publication Data

US 2006/0166736 A1 Jul. 27, 2006

(30) Foreign Application Priority Data

Jan. 17, 2003 (AT) .................................. A 58/2003

(51) Int. Cl.
*A63F 9/24* (2006.01)
*A63F 13/00* (2006.01)
*G06F 17/00* (2006.01)
*G06F 19/00* (2006.01)

(52) U.S. Cl. ........................................... 463/16; 463/17

(58) Field of Classification Search ..................... 463/20
See application file for complete search history.

(56) References Cited

U.S. PATENT DOCUMENTS 5,636,843 A * 6/1997 Roberts ......................... 273/292

(Continued)

FOREIGN PATENT DOCUMENTS

DE 195 11 856 A1 10/1996

(Continued)

OTHER PUBLICATIONS

Ace-Ten, "Blackjack Basics", http://www.ace-ten.com/fundamentals/basics.html. Created Jan. 5, 2002. Accessed Jun. 19, 2009.*

(Continued)

*Primary Examiner* — David L Lewis
*Assistant Examiner* — Reginald Renwick
(74) *Attorney, Agent, or Firm* — Lawrence A. Greenberg; Werner H. Stemer; Ralph E. Locher

(57) ABSTRACT

The invention relates to a method for initializing a desired game in an electronic gaming machine, in which a predefined fee has to be paid in order to play the game and the events of the game are displayed on a screen. According to the invention the player is offered the following alternatives a) he can decline the offer of a preliminary game which is played before the desired game, or b) he can play this preliminary game, if he declines the preliminary game, the main game is played with predefined chances of winning and predefined win amounts, when the preliminary game, which permits only a win or a loss—i.e. without setting or paying a win amount—, is selected and after it is played, the win or loss of the preliminary game is established, the main game is played when the preliminary game is won, and, when the preliminary game is lost, game play is ended, the money inserted is lost, and the gaming machine may offer the player the stated alternatives again.

20 Claims, 1 Drawing Sheet

U.S. PATENT DOCUMENTS

| | | | | |
|---|---|---|---|---|
| 5,695,402 | A * | 12/1997 | Stupak | 463/20 |
| 5,851,148 | A * | 12/1998 | Brune et al. | 463/25 |
| 5,951,397 | A * | 9/1999 | Dickinson | 463/36 |
| 5,957,774 | A | 9/1999 | Holmes, Jr. et al. | |
| 6,050,895 | A * | 4/2000 | Luciano et al. | 463/7 |
| 6,159,097 | A * | 12/2000 | Gura | 463/20 |
| 6,416,406 | B1 | 7/2002 | Duhamel | |
| 6,446,965 | B1 | 9/2002 | Boulton | |
| 6,692,003 | B2 * | 2/2004 | Potter et al. | 273/274 |
| 7,314,408 | B2 * | 1/2008 | Cannon | 463/16 |
| 2002/0155880 | A1 | 10/2002 | Glavich et al. | |
| 2002/0160825 | A1 * | 10/2002 | Nicastro et al. | 463/16 |
| 2002/0193162 | A1 * | 12/2002 | Walker et al. | 463/42 |
| 2003/0008705 | A1 | 1/2003 | Baerlocher et al. | |
| 2003/0013516 | A1 * | 1/2003 | Walker et al. | 463/25 |
| 2004/0053680 | A1 * | 3/2004 | Schultz | 463/20 |
| 2004/0132525 | A1 * | 7/2004 | Baerlocher et al. | 463/16 |
| 2006/0068498 | A1 * | 3/2006 | White et al. | 436/17 |

FOREIGN PATENT DOCUMENTS

| | | | |
|---|---|---|---|
| EP | 0971326 | A2 | 1/2000 |
| EP | 1 067 491 | A2 | 4/2000 |

OTHER PUBLICATIONS

Ace-Ten, “Chances of Winning Blackjack”, http://www.ace-ten.com/fundamentals/chances.html. Created Jun. 10, 2002. Accessed Jun. 19, 2009.*

* cited by examiner

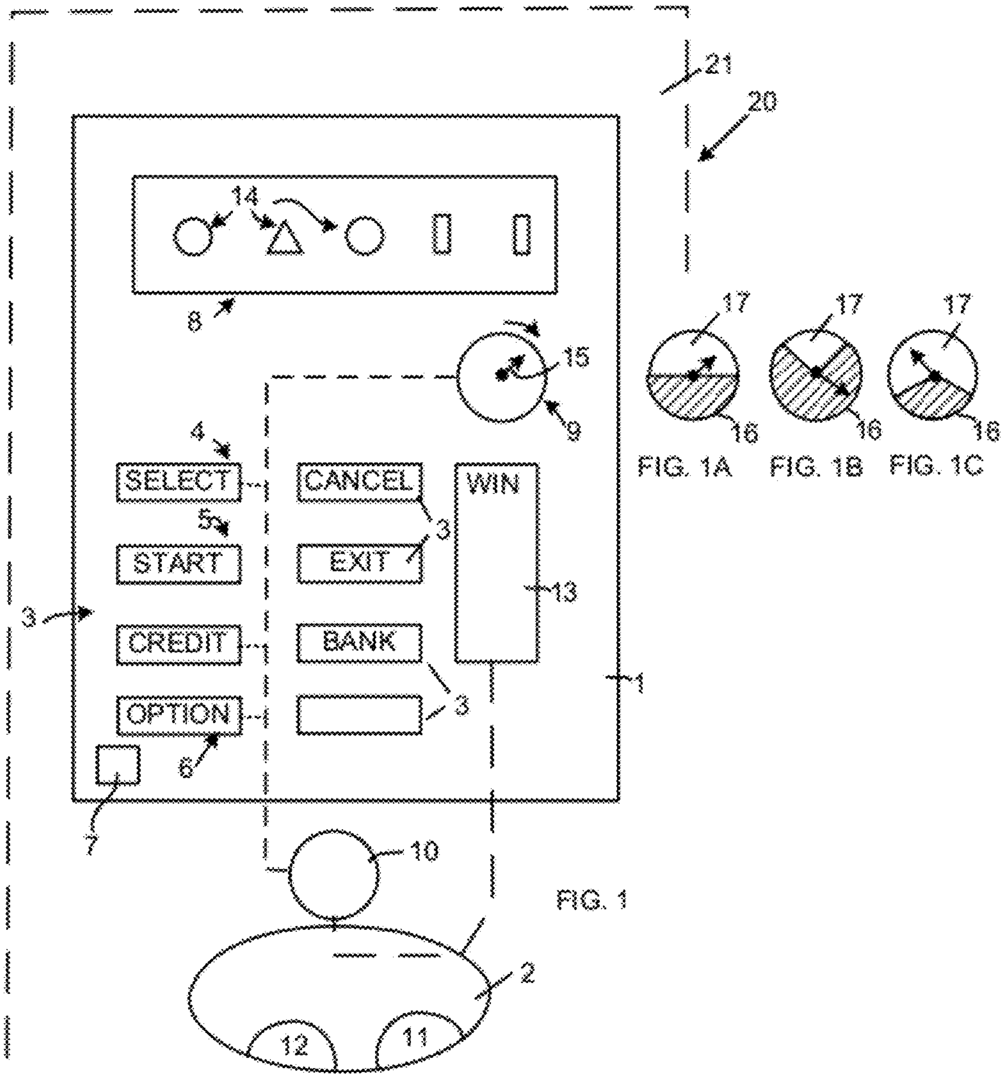
FIG. 1A FIG. 1B FIG. 1C
FIG. 1
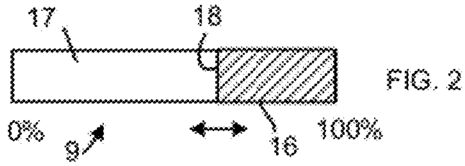
FIG. 2

METHOD FOR INITIALIZING A GAME, AND A GAMING MACHINE

BACKGROUND OF THE INVENTION

Field of the Invention

The invention relates to a method for initializing a desired game in an electronic gaming machine, in which a predefined fee has to he paid in order to play the game and the events of the game are displayed on a screen, and to a gaming machine for playing electronic games,in particular games of chance, having a control unit for controlling the events of the game which are displayed on a screen, it being possible for the player to influence said events of the game using control devices connected to the control unit in particular for carrying out the above-mentioned method.

The aim of the invention is to make playing electronic gaming machines more diverse and more interesting by redesigning game play shown on a screen. The intention is to increase the incentive to play, in particular through an increased number of wins or higher wins and/or through acceptable and clear risks.

These electronic gaming machines may be any gaming machines, for example slot machines, poker machines, roulette machines and bingo machines, in which the player is credited with a win amount after successfully completing a game. These known electronic gaming machines which form the basis of the invention comprise a screen on which the events of the game take place, and also all of the necessary devices for playing the game, for inserting money, and for releasing it through corresponding release mechanisms etc.

SUMMARY OF THE INVENTION

According to the invention, a method of the type mentioned in the introduction is characterized by the features listed in the characterizing part of claim 1. A gaming machine according to the invention, in particular for carrying out the method according to the invention, is characterized by the features listed in the characterizing part of claim 5.

One essential feature of the invention is that, after paying the fee, the player is offered the opportunity to complete a preliminary game to a game which is selected by him and can be played on the gaming machine. The player can select this preliminary game or decline it. If the player declines the preliminary game, the main game offered by the gaming machine is played and offers the player the chances of winning and/or win amounts which are defined in advance or are known to the player.

If the player selects the preliminary game, he faces a certain risk since the preliminary game can end in a loss or win. The player can play the desired main game only if the preliminary game ends in a win. There is therefore a danger of the player losing his money in the preliminary game and not being able to play the main game at all.

In particular, the preliminary game and the main game should be considered to be one game for which the fee has to be paid or selected before starting the preliminary game.

Using this procedure, the player is given more incentive to play, in particular when—as provided in claim 2—the chances of winning and/or the win amounts for the subsequent main game or a number of subsequent main games are increased upon successful completion of the preliminary game. The player can select certain, in particular predefined, probabilities of winning the preliminary game which are either at a fixed level or whose level can be selected by the player as desired. If the player declines the preliminary game or chooses a 100% probability of winning the preliminary game, he does not have any better chances of winning and/or win amounts for at least one subsequent main game; however, if the player does take a certain risk in the preliminary game, the chances of winning and/or the win amounts for the subsequent main game are increased, for example linearly, depending on the selected probability of winning.

The invention provides for a further display region to be provided on the screen in addition to the display region provided for displaying the events of the game, and for this further display region to be able to graphically show the events of the preliminary game and/or the probability of winning the preliminary game selected by the player.

Provision may be made for the control unit to comprise an option unit for probabilities of winning which can be operated by the player and which he can use to set or select different probabilities of winning the preliminary game, these probabilities of winning optionally being displayed and/or provided on a display unit, and provision may be made for the option unit and the selection unit to be combined to form a common unit, using which a preliminary game can be selected and the probabilities of winning the preliminary game can be defined, for example by pressing a control key or a control field a number of times.

The control devices which are available to the player may be in the form of touchscreen fields on the screen which displays the events of the game, so that the player can control the game, in particular select or decline to play a preliminary game, and/or can set or select his desired probability of winning the preliminary game merely by touching the corresponding fields.

Advantageous embodiments of the invention can be found in the following description, drawings and patent claims.

BRIEF DESCRIPTION OF THE DRAWING

FIG. 1 is a schematic illustration of the screen of a gaming machine with the control unit which controls the events of the game. FIGS. 1*a*, 1*b* and 1*c* show an option unit with different chances of winning a preliminary game.

FIG. 2 shows an alternative embodiment of an option unit.

DESCRIPTION OF THE PREFERRED EMBODIMENTS

The gaming machine 20 for playing an electronic game indicated in FIG. 1 comprises, in a housing 21, a screen 1 on which the events of the game are displayed for the player in an optionally delimited display region 8. The present case illustrates a slot machine in which the player is shown a number of symbols, and a win can be achieved as a function of how many identical symbols are shown. In other types of gaming machines, different illustrations appear in the display region 8.

The player is provided with a number of control devices 3, in particular in the form of touchscreen fields on the screen 1. However, it is also possible to arrange the control devices outside the screen 1 in the form of keys or buttons known from gaming machines of this type. In addition to a start field 5, with which the player can start the gaming machine 1, an EXIT field for ending the game, a BANK field for displaying credit, a CANCEL field for correcting incorrect operations, a CREDIT field for displaying playing credit, and an OPTION field 6 which will be explained later may be provided. Further control devices 3 may be provided if required.

When the SELECT field 4 is operated, the player can elect to play an offered preliminary game which is played before the main game played on the display region 8. In order to play the preliminary game, a further display region 9 on which the events of the preliminary game are graphically displayed can be provided on the screen 1. The preliminary game could also be played in the display region 8. This preliminary game ends in a win or a loss and is generally played without a win amount being paid out. The sole aim of this preliminary game is to establish permission for the player to play the main game which is displayed in the display region 8.

If the player does not select a preliminary game using the SELECT field 4, the money inserted by the player is used to directly play the main game. If the player selects a preliminary game, he can specify certain probabilities of winning the preliminary game. For this purpose, an OPTION field 6 is provided which, when it is operated, can define the probability of winning the preliminary game, with a selection unit 10 of the control device 2 consequently altering the probabilities of winning and/or the win amounts at least for the subsequent main game as a function of the probability of winning selected for the preliminary game. Lower probabilities of winning the preliminary game result in higher probabilities of winning and/or win amounts for at least one subsequent main game. The selection unit 10 and/or the control unit 2 correspondingly control a win display 13 which displays the potential win amounts for the main game which is reached when the preliminary game is won.

The SELECT field 4 and the OPTION field 6 can be combined to form a single field, and the corresponding selections can then be made by touching or operating this field or a corresponding key a number of times in succession.

In FIG. 1, a pointer 15 which can be rotated in a circular display region 9, for example in accordance with the indicated arrow, is provided in order to carry out the events of a potential preliminary game; however no preliminary game has been selected in the illustration in FIG. 1. The selected and shown probability of winning is 100%, or no probability of winning selected by the player has been displayed.

FIG. 1*a* shows that the player has set a 50% probability of winning the preliminary game. The probability of winning is indicated by the shaded surface area 16 which is associated with a loss and in the illustrated exemplary embodiment according to FIG. 1*a* is 50% of the circular area of the display region 9. The preliminary game involves the pointer 15 revolving around its middle point and then stopping either in the shaded region 16 or in the unshaded region 17. If the pointer stops in the unshaded region 17, the preliminary game is judged to have been won; if the pointer stops in the shaded region 16, this means the preliminary game has been lost. There is a 50:50 chance of this happening.

In FIG. 1*b*, the display region 9 shows a selected probability of winning of 25%, as can be seen by the fact that the shaded area 16 which is associated with a loss has been expanded to 75% of the area of the display region 9.

FIG. 1*c* shows a 1:2 probability of winning; the shaded area 16 is half the size of the area 17.

The probabilities of winning can also be displayed, for example, by correspondingly illuminating the display region 9, for example the base color of the circular field 9 in FIG. 1 may be green and the partial area 16 of the region 9, which corresponds to the probability of losing or a loss, is red.

The probabilities of winning which the player selects for the preliminary game have a predefined influence at least on the subsequent main game; the lower the probability of winning the preliminary game is selected to be, the higher the selection unit 10 sets the chances of winning and/or win amounts which are shown on the display 13.

FIG. 2 shows an alternative display region 9 for displaying the events of the preliminary game. The display region 9 is divided by a separating region 18 which can be moved in accordance with the illustrated arrow. The display region 9 is divided into a shaded region 16, for example a loss region, and into an unshaded region 17, for example a win region, in accordance with the probability of winning selected by the player; the larger the region 17, the greater is the probability of winning the preliminary game. The position of the divider 18 can be defined by the player correspondingly operating the option field 6 and/or the common unit. If the divider 18 is at the right-hand edge, there is no area 16 which corresponds to a loss and the probability of winning the preliminary game is 100%. The preliminary game is declined at this setting.

Any desired design or shape can be selected for the display region 9 provided for the preliminary game. According to FIG. 2, the size of the area of the two regions 16 and 17 can—as illustrated—be selected and said areas can be of different colors. In order to play the preliminary game, the areas 16 and 17 flash red and green, one immediately after the other; if the area 17 goes green after a corresponding period of time, the preliminary game is won. If the field 16 goes red, the preliminary game is lost. The preliminary game is played and the chances of winning are selected in a display region 9 in a manner linked to one another. The selected probability of winning, that is to say the size of the area 16 in relation to the size of the area 17 selected, is set by the player operating the OPTION field 6. The game, which is played out by the pointer 15 rotating and correspondingly stopping in one of the fields 16 or 17, or by the areas 16 and 17 flashing alternately and the last lit area 16 or 17 being selected, is carried out by random number generators 11 in the control unit 2 in accordance with random criteria.

The events of the game, both in the display region 8 and in the further display region 9, are controlled by random number generators 11 provided in the control unit 2.

In order to keep the player happy despite an all too high or risky setting or choice of chances of winning the preliminary game, the control unit 2 may comprise a win-determining unit 12 which grants the player a random win when it establishes that a certain number of preliminary games have been lost. It is then possible to award a win amount for a preliminary game determined in this way when the number of wins achieved deviates too far toward the loss side from the statistical average on account of the events of the game played out in accordance with statistical rules.

Provision may be made for the control unit 2, when it establishes that the player has won the preliminary game, to play or start the main game immediately after the preliminary game, or for a start key 5 (START) to be provided for the player which can be used to initialize or start the main game, possibly after a further fee has been paid, with the control unit 2, when it establishes that the preliminary game is lost, allowing a new preliminary game to be started and collecting the fee or deducting it from the player's credit account.

It is expedient if the control unit 2 and/or the selection unit 10 and/or the random number generator 11 and/or the win-determining unit 12 are formed by a microprocessor, or form part of a microprocessor or computer.

In principle, it is possible to use any games as the preliminary game. The probability of winning the preliminary game may also be displayed separately from the display region of the preliminary game.

I claim:

1. A method for initializing a desired game in an electronic gaming machine, wherein a predefined fee is required to be paid to play the game and game events are displayed on a screen, the method which comprises:

offering to a player the following alternatives:

a) play the preliminary game, and select or define different probabilities or chances of winning the preliminary game, the preliminary game only permitting a win or a loss without setting or paying a win amount, the player selecting or defining the different probabilities or chances of winning from a range of possible probabilities or chances; and b) decline an offer to play a preliminary game before the desired game;

the electronic gaming machine being configured to:

if the player declines the preliminary game, play the desired game with predefined chances of winning and predefined win amounts; and if the player selects the preliminary game, and, after the preliminary game has been played, establish a preliminary win or a preliminary loss;

in case of a preliminary win, playing the desired game, and adjusting chances of winning and/or win amounts for the desired game or a predefined number of desired games in dependence on the probabilities or chances of winning selected by the player;

all of the wins in the preliminary game are determined with the chances or probabilities of winning being predefined according to statistical or random criteria;

in case of a preliminary loss, terminating game play, and optionally offering the alternatives a) and b); and when a number of preliminary games are lost or when the desired game is not reached very often, determining additional possibilities of winning and/or win amounts according to statistical criteria and granting the additional possibilities.

2. The method according to claim 1, which comprises determining all of the wins in the preliminary game and in the desired game with the chances or probabilities of winning being predefined according to statistical or random criteria.

3. A gaming apparatus for playing an electronic game, comprising:

a control unit for controlling events of the game and a screen connected to said control unit for displaying events of the game;

control devices connected to said control unit for enabling a player to influence the events of the game;

said control devices including a selection unit connected to said control unit and operable by the player, the selection unit enabling the player to call up or initialize a preliminary game prior to a main game;

an option unit connected to said control unit and operable by the player to set or select different probabilities of winning in the preliminary game, the option unit configured to allow the player to set or select the different probabilities of winning from a range of possible probabilities;

said option unit and said selection unit being combined to form a common unit enabling a preliminary game to be selected and the probabilities of winning the preliminary game to be defined;

said control unit configured to carry out a method for initializing a desired game in an electronic gaming machine, wherein a predefined fee is required to be paid to play the game and game events are displayed on a screen, the method including the steps of:

offering to a player the following alternatives:

a) play the preliminary game, and set or select different probabilities of winning the preliminary game, the preliminary game only permitting a win or a loss without setting or paying a win amount; and b) decline an offer to play a preliminary game before the desired game;

if the player declines the preliminary game, playing the desired game with predefined chances of winning and predefined win amounts;

if the player selects the preliminary game, and, after the preliminary game has been played, establishing a preliminary win or a preliminary loss;

in case of a preliminary win, playing the desired game, and adjusting chances of winning and/or win amounts for the desired game or a predefined number of desired games in dependence on the probabilities or chances of winning selected by the player;

in case of a preliminary loss, terminating game play, and optionally offering the alternatives a) and b).

4. The gaming apparatus according to claim 3 configured for playing games of chance.

5. The gaming apparatus according to claim 3, wherein said screen is adapted to display events of the preliminary game, and the probabilities of winning the preliminary game are displayed on a display region.

6. The gaming apparatus according to claim 3, wherein said control unit, upon determining that the player has won the preliminary game, plays or starts the main game immediately after the preliminary game.

7. The gaming apparatus according to claim 3, which comprises a start key enabling the player to initialize or start the main game, optionally after payment of a fee for playing the main game.

8. The gaming apparatus according to claim 3, wherein said control unit, upon determining that the preliminary game has been lost, allows a new preliminary game to be started and collects the fee or debits the player's account.

9. The gaming apparatus according to claim 3, wherein said screen has a main display region for displaying the events of the game, and a further display region for graphically showing events of the preliminary game and/or probabilities of winning the preliminary game selected by the player.

10. The gaming apparatus according to claim 3, wherein said common unit is a touchscreen field, and the probabilities of winning are selectable by pressing the touchscreen field a given number of times.

11. The gaming apparatus according to claim 3, wherein said control unit comprises a presetting or selection unit for probabilities of winning and/or the level of win amounts for the main game, and said presetting or selection unit is connected to said common unit or is controlled by said common unit.

12. The gaming apparatus according to claim 3, wherein said control unit comprises a presetting or selection unit for probabilities of winning and/or the level of win amounts for the main game, and said presetting or selection unit is connected to said option unit.

13. The gaming apparatus according to claim 3, wherein said control unit includes at least one random number generator for determining results of at least one of the preliminary game and the main game.

14. The gaming apparatus according to claim 3, wherein said control unit includes a win-determining unit for the preliminary game configured to allocate wins to the player or to allow the player to win a preliminary game in dependence on a number of preliminary games which that have been played and/or in dependence on the predefined chances of winning.

15. The gaming apparatus according to claim 14, wherein said control unit is configured to determine whether the preliminary game has been, even if the game has been lost, in dependence on a number of preliminary games having been played.

16. The gaming apparatus according to claim 3, wherein said control unit is configured to define the probabilities of winning and/or the win amounts at least of one main game following a successful preliminary game as a function of a probability of winning selected by the player for the preliminary game.

17. The gaming apparatus according to claim 16, wherein the probabilities of winning and/or the win amounts are defined with a linear dependence.

18. The gaming apparatus according to claim 3, which further comprises a win display, optionally connected to said selection unit and displaying the win amounts predefined for the main game and/or the win amounts altered by the probabilities of winning selected for the preliminary game.

19. The gaming apparatus according to claim 3, wherein at least one of said control unit, said selection unit, a random number generator, and a win-determining unit are formed by a microprocessor.

20. The gaming apparatus according to claim 3, wherein at least one of said control unit, said selection unit, a random number generator, and a win-determining unit form a part of a computer.

* * * * *